United States Patent [19]

Wilson et al.

[11] 4,062,570
[45] Dec. 13, 1977

[54] MANDREL FOR EXPLOSIVE WELDING TUBULAR MEMBERS

[75] Inventors: Wayne Richard Wilson, Bath; William James Kirkpatrick, Kingston, both of Canada

[73] Assignee: Alcan Research and Development Limited, Montreal, Canada

[21] Appl. No.: 710,781

[22] Filed: Aug. 2, 1976

Related U.S. Application Data

[62] Division of Ser. No. 478,158, June 10, 1974, Pat. No. 3,985,279.

[30] Foreign Application Priority Data

June 13, 1973 Canada .................................. 173964

[51] Int. Cl.² .......................... F16L 13/02; B23K 5/22
[52] U.S. Cl. ........................................ 285/22; 228/50; 285/286; 285/397
[58] Field of Search ............................. 228/107–109, 228/2.5, 44.5, 50; 285/21, 22, 370, 397, 286; 29/421 E

[56] References Cited

U.S. PATENT DOCUMENTS

| | | | |
|---|---|---|---|
| 623,416 | 4/1899 | McCrory | 285/370 X |
| 1,529,525 | 3/1925 | Winter | 285/370 X |
| 2,168,631 | 8/1939 | Scott | 285/370 X |
| 2,366,579 | 1/1945 | Von Ahrens | 285/22 |
| 2,681,028 | 6/1954 | Phillips | 285/22 X |
| 3,263,323 | 8/1966 | Maher | 228/107 |
| 3,342,511 | 9/1967 | Galloway | 285/397 X |

FOREIGN PATENT DOCUMENTS

| | | | |
|---|---|---|---|
| 1,351,039 | 3/1963 | France | 285/370 |
| 2,149,345 | 4/1972 | Germany | 285/370 |

*Primary Examiner*—Harold D. Whitehead
*Assistant Examiner*—Nicholas P. Godici
*Attorney, Agent, or Firm*—Cooper, Dunham, Clark, Griffin & Moran

[57] ABSTRACT

The invention relates to a method of joining together the ends of tubular metal members by explosive welding and to a permanent, self-aligning backing mandrel for use in the method. The mandrel is in the form of a tubular member having an outer face defining a cylindrical portion and an axially adjacent tapered portion, the maximum diameter of the tapered portion being greater than the diameter of the cylindrical portion. An annular shoulder extends outwardly between the cylindrical portion and the maximum diameter end of the tapered portion, which tapers inwardly away from the shoulder. One pipe end is outwardly flared and fits over the tapered portion of the mandrel and the other pipe end is non-flared and fits over the cylindrical portion, abutting the shoulder. The outer end of the flared pipe end overlaps the non-flared pipe, defining therewith an annular wedge-shaped outwardly-opening space. An explosive is located around this outer overlapping end and is detonated to weld the ends together.

3 Claims, 4 Drawing Figures

MANDREL FOR EXPLOSIVE WELDING TUBULAR MEMBERS

This application is a division of application Ser. No. 478,158 filed June 10, 1974, now U.S. Pat. No. 3,985,279, issued Oct. 12, 1976.

This invention relates to a method of joining together the ends of tubular metal members by explosive welding, as well as to a permanent, self-aligning internal backup mandrel for use in the method.

Currently, in the laying of metal pipes, e.g. gas distribution pipes, the manual metal-arc process is used to make either full penetration butt joints or fillet welded sleeve joints. These fusion welding methods account for a large part of the total pipe laying costs primarily because they require the presence of a skilled pipe welder. Although the actual welding time is relatively short when taken in context of the whole pipe laying operation, the situation often arises where a high skilled and expensive man spends most of his time waiting for joints to be prepared for welding. The method also requires mobile generators on site, with ancillary welding equipment, involving large capital outlay.

Because of these problems, consideration has been given to the use of explosive welding techniques for the joining of metal pipes. Explosive welding technology has been developing in recent years at an extremely rapid rate and now is in use commercially. However, the explosive joining of pipes up to now has been concerned with relatively short lengths of pipe, such that it has been practical either to locate the explosive charge internally in conjunction with an external supporting "anvil" and leading detonating wires, etc. out of the end of the pipe, or to use an external explosive charge in conjunction with an internal mandrel which functions as an anvil temporarily and then is subsequently withdrawn from the pipe. However, it will be readily appreciated that these approaches are not feasible with the long pipe lengths involved in some systems, such as result from the use of coiled lengths which are installed by "ploughing" the pipe into the ground rather than by the conventional method of ditching and joining short, e.g. 40-foot lengths. Pipe lengths with the "ploughing" method generally vary from a few hundred feet up to 5,000 feet, or more.

As an example of a prior method of joining the ends of tubular metal members by explosive welding there can be mentioned Van Der Horst British Pat. No. 1,220,171. It describes a method of welding together the ends of two tubular metal members by locating the two ends to be welded adjacent each other so that one end overlaps the other and defines therewith an annular wedge-shaped outwardly opening space. An explosive material is located around the outer overlapping end and the explosive is detonated to weld the ends together. This patent also states that in order to avoid as much as possible radially inwardly deforming the tube, it is preferable to use a mandrel. It further states that the mandrel is of the expandible type to allow easy introduction into the tube to be welded and easy removal after welding. Once again, it will be evident that such a technique is useful only in relation to short lengths of pipes.

It is, therefore, the object of the present invention to provide an improved technique for explosive welding of pipes which will require the removal of nothing from the pipe after the welding, thereby making possible the explosive welding of very long lengths of pipes e.g. several hundred feet, or more.

According to one feature of the present invention, a novel type of internal mandrel has been developed which permanently remains in the pipe. The novel mandrel is in the form of a tubular member having an outer face which defines a cylindrical portion and an axially adjacent truncated conical portion. The maximum diameter of the conical portion is greater than the diameter of the cylindrical portion and an annular shoulder extends outwardly between the cylindrical surface and the maximum diameter end of the conical portion, so that the conical portion tapers inwardly away from the shoulder. The end of one pipe being joined fits over the cylindrical portion and abuts against the annular shoulder. The end of the other pipe member is flared outwardly at the same taper as the truncated conical portion of the mandrel so that the conical portion of the mandrel will fit snugly within the flared pipe end. This flared pipe end also extends beyond the conical portion of the mandrel and overlaps the end of the other pipe mounted on the cylindrical portion of the mandrel. Thus, there is created an annular wedge-shaped outwardly-opening space between the two pipes.

In order to complete the weld an explosive material is applied around the outer overlapping flared pipe end and the explosive is detonated to weld the ends together.

The shoulder on the mandrel of this invention serves to precisely locate initially and maintain the location of the cylindrical anvil portion of the mandrel, longitudinally, with respect to the portion of the flared pipe end bearing the explosive charge. The truncated conical portion of the mandrel extending inwardly from the shoulder and having the same degree of taper as the flared pipe end section, serves the purpose of aligning initially and maintaining the alignment of the flared pipe with the non-flared pipe.

While the walls of the mandrel can be quite thin, it will be evident that they still result in some restriction in the internal diameter of the pipe in the joint area. If such restriction is not acceptable, according to another feature of the invention, one or both pipes can be expanded at the end(s), in addition to the flaring of one pipe end, so that when the mandrel is in place, the inside diameter in that location is the same as the inside diameter of the normal pipe. The steps of expanding and of flaring the pipe ends, besides providing the proper geometry to the pipe end, also have the advantage of serving to remove any out of roundness defects in the pipes. Thus, some ovality can be introduced into the pipe from having been wound on a reel and the expanding and the flaring provide truly round pipe ends to mate accurately with the mandrel.

Although the procedure and mandrel of this invention are particularly well adapted for the explosive welding of small diameter aluminium pipe, the technique is equally applicable to pipes of other metals, such as steel, as well as to pipes of many different diameters and wall thicknesses. Moreover, in addition to gas distribution pipes, it is applicable to the joining of almost any types of pipes including buried water pipes, tubular bus conductors, etc.

As the explosive charge for the welding, any of the commercially available explosives with the right characteristics for this purpose can be used. A particularly useful charge has been found to be 20 grains/foot PETN (pentaerythritol tetranitrate) cord. The total amount and shape of charge being used will, of course, be dependent upon the wall thickness, the diameter, the alloy composition, and the mechanical properties of the pipes being joined. The thickness of the mandrel will be dependent on the amount of charge used. The mandrel can conveniently be manufactured from stainless steel or aluminium, for example, and may have a wall thickness of as little as 3/32 inch, or less.

The angle of the tapered portion of the mandrel can extend over a relatively large range, e.g. at an angle of 5° to 30° but will usually be in the order of about 10° to 15°. The length of contact surface between the pipes and the mandrel will depend primarily on the wall thickness and diameters of the pipes being joined as well as the length of the overlapping portion between the pipes themselves and the flare angle used.

The invention will now be further illustrated by the attached drawings in which.

Figure 1:
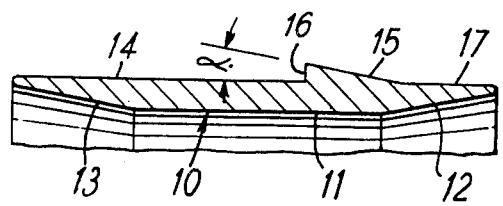
FIG. 1 is a sectional view of a preferred form of mandrel according to the invention.
Figure 2:
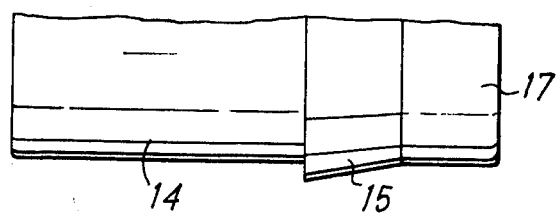
FIG. 2 is an elevation of the mandrel shown in FIG. 1.

Referring to the drawings, FIGS. 1 and 2 show a preferred embodiment of the mandrel according to this invention. As can be seen particularly clearly from the cross sectional view in FIG. 1, the mandrel 10 has an interior cylindrical face 11 with outwardly chamfered end portions 12 and 13. The outer face of the mandrel which engages the pipes to be joined includes a cylindrical portion 14 and a tapered or frustoconical portion 15 which tapers inwardly from a shoulder portion 16 which is perpendicular to the axis of the mandrel. The inward end of the tapered portion 15 merges into a cylindrical portion 17.

Figure 3:
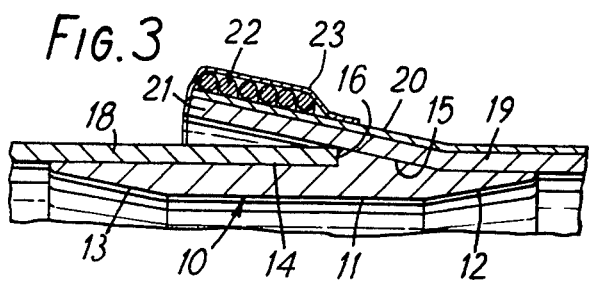
FIG. 3 is a sectional view showing two sections of pipe in position on a mandrel ready for welding.

The mandrel as it is used in explosive welding of two pipes is illustrated in FIG. 3. Thus, it will be seen that one pipe end 18 fits snugly over the cylindrical face 14 and abuts against the shoulder 16. The second pipe end 19 has an outwardly flared portion 21 tapering outwardly at the same angle as the tapered mandrel face 15. As shown in FIG. 3, a portion of the tapered section 21 overlaps a portion of pipe 18 and it is in this region in which the explosive welding occurs.

If the outer surface of the pipes is covered with a coating 20, this must, of course, be removed on the pipe end 18 so that a metal-to-metal contact will be provided for the explosive welding.

On the overlapping flared portion 21 there is provided a number of turns of PETN cord 22 and this is held in place by a vinyl tape 23. The explosive 22 is then fired by means of a detonator (not shown), being initiated at the juncture of the flared and non-flared ends of the pipes.

Figure 4:
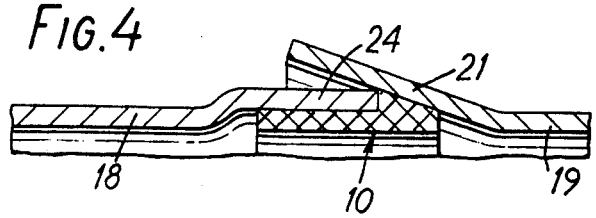
FIG. 4 illustrates an alternative technique in which one of the pipe ends has been expanded.

FIG. 4 shows an embodiment of the invention whereby the inside diameter of the mandrel is equal to the normal inside diameter of the pipes being joined. This is accomplished by expanding an end portion of pipe 18 into the expanded section 24. This expanded portion 24 then fits over the cylindrical face of mandrel 10. The flared end 21 of pipe 19 is then brought into engagement with the tapered portion of mandrel 10, such that when these faces come into engagement, the inner face of pipe 19 will be in alignment with the inner face of pipe 18 as well as the inner face of mandrel 10. In this way there is no restriction at the location of the explosive weld. It will be also noted in FIG. 4 that the mandrel 10 does not contain the chamfered end portions 12 and 13 shown in FIG. 1. These are clearly not essential to the invention and merely serves to provide a smoother flow. Of course, for the particular arrangement shown in FIG. 4, the mandrel 10 could be specially designed to completely fill the end gaps shown so as to present a smooth, uninterrupted interior face.

Figure 5:
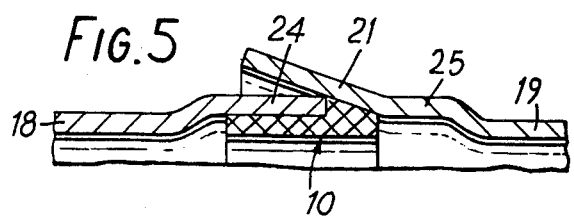
FIG. 5 is yet another embodiment in which both pipe ends have been expanded.

Yet another arrangement is shown in FIG. 5 and in this embodiment the pipe 19 has an expanded cylindrical portion 25 as well as the usual outwardly flared portion 21. With this arrangement the flared portion engages the mandrel 10 in much the same manner as in FIG. 3 while at the same time allowing a constant interior diameter for the pipes 18 and 19 as well as mandrel 10. Again in this configuration, the ends of the mandrel 10 can be extended to present cylindrical faces which substantially fill the annular gaps between the ends of the mandrel as shown and the ends of the nomral pipe configurations 18 and 19; or, or course, a mandrel as shown in FIG. 1 may be used to this FIG. 5 configuration.

EXAMPLE

The technique of this invention was used for the explosive welding of 1½ and of 2 inch AA6063-T1A aluminium alloy pipes. For welding these, two mandrels were made, one having a diameter at face 14 of 2.195 inches and the other having a diameter of 1.725 inches. Both mandrels were 2½ inches long with the end chamfered portions 12 and 13 each being five-eighths inch long and the face 11 being 1¼ inches long. The cylindrical face 14 was 1¼ inches long, the tapered face 15 was ½ inch long and the cylindrical face 17 was also ½ inch long.

The shoulder 16 measured 0.085 inch and this was equal to the wall thickness of the pipes being joined. The angle $\alpha$ was 10°.

The mandrel had a wall thickness between faces 11 and 14 of one-eighth inch and was made from AA7004-T5 aluminium alloy.

Six turns of 20 grains/foot PETN were applied around the overlapping flange portion 21 over a heat shrunk polyethylene buffer and then detonated. Pressure tests proved the joints had been welded. Subsequent ultrasonic inspection confirmed a bond width of about five-eighths - three-fourths inch with no evidence of a d'Autriche effect.

Tensile tests both on full section and coupons failed in the parent metal remote from the weld area at the same tensile strength as the pipe. Pressure tests were carried out on the 1½ inch diameter pipe and the pipe ruptured remote from the weld at a hydraulic pressure of 2260 psi.

Typical tensile strengths of the 1½ inch and 2 inch diameter AA6063-T1A alloy pipe are shown in Table 1 below.

Table 1

| | Ultimate Tensile Strength | |
|---|---|---|
| | MPa | (Ksi) |
| Parent Metal | 155 | (22.7) |
| Typical full section tensile tests of welded pipe | 153 | (22.4) |
| Typical coupon tensile tests from welded pipe | 157 | (22.8) |

It will be appreciated that the function of the conical surface of the mandrel is to hold the flared portion of the outer pipe accurately centred in relation to the end portion of the inner pipe supported on the mandrel, so that an annular wedge-shaped space of substantially uniform dimensions extends between the outer surface of the inner pipe and the inner surface of the flared end of the outer pipe. By reason of the accurate centring of the pipe ends in relation to each other and the consequent uniform shape of the wedgeshaped space, a substantially uniform weld is formed around the periphery of the joint.

After the formation of the joint the mandrel serves no further useful function. In order that it shall not have any deleterious effect on the pipe it is preferred that the mandrel should be anodic in relation to the pipes so that, in the event of corrosion, the mandrel is preferentially corroded.

We claim:

1. A self-aligning permanent backup mandrel for use in welding together the ends of two tubular metal members for fluid flow, by explosion welding, said mandrel consisting of an integral, single, fluid-conducting tubular member having an outer face defining a single cylindrical portion for insertion in one end of a first tubular member and a single axially adjacent truncated conical portion for insertion in the opposed end of a second tubular member, the maximum diameter of said conical portion being greater than the diameter of the cylindrical portion, and an annular shoulder extending outwardly between the cylindrical surface and the end of the conical portion of maximum diameter with the conical portion tapering inwardly away from said shoulder, said shoulder being perpendicular to the axis of the mandrel and having a height equal to the wall thickness of said first tubular member, said conical portion tapering at an angle of about 5° to 30° relative to the axis of the mandrel, said cylindrical and conical portions being mutually shaped and disposed so that when the conical portion is fitted into the second tubular member, with said second tubular member flared outwardly at an angle confirming to the conical portion and to a flared open end portion of greater diameter than the aforesaid maximum diameter, the said flared end portion overlies the first tubular member when the first member is placed on the cylindrical portion so that the said flared end portion can be explosively pressed and welded against said first tubular member.

2. A mandrel according to claim 1 wherein the conical portion tapers at an angle of about 10° and 15° relative to the axis of the mandrel.

3. A mandrel according to claim 1 in which said tubular member incorporates an axial passage defined by a single cylindrical surface from one end to the other end of the tubular member.

* * * * *